United States Patent
Reusche et al.

(10) Patent No.: US 8,302,562 B2
(45) Date of Patent: Nov. 6, 2012

(54) PET BED COOLING SYSTEM AND METHOD

(75) Inventors: Thomas K. Reusche, Elburn, IL (US); Philip E. Chumbley, Aurora, IL (US)

(73) Assignee: Allied Precision Industries, Inc., Elburn, IL (US)

( * ) Notice: Subject to any disclaimer, the term of this patent is extended or adjusted under 35 U.S.C. 154(b) by 569 days.

(21) Appl. No.: 12/233,291

(22) Filed: Sep. 18, 2008

(65) Prior Publication Data

US 2009/0084320 A1 Apr. 2, 2009

Related U.S. Application Data

(60) Provisional application No. 60/975,854, filed on Sep. 28, 2007.

(51) Int. Cl.
*A01K 1/035* (2006.01)

(52) U.S. Cl. .............................. 119/28.5; 5/645; 5/655.5

(58) Field of Classification Search ................. 119/28.5, 119/856, 858, 859, 712, 905, 907, 908; D30/118; 5/417, 420, 682, 722, 724, 652.1, 655.5, 5/657, 645, 676
See application file for complete search history.

(56) References Cited

U.S. PATENT DOCUMENTS

| | | | | |
|---|---|---|---|---|
| 3,787,908 A * | 1/1974 | Beck et al. ........................ 5/676 |
| 3,889,684 A * | 6/1975 | Lebold .......................... 607/109 |
| 4,060,276 A * | 11/1977 | Lindsay .................... 297/180.11 |
| 4,064,835 A * | 12/1977 | Rabenbauer ................. 119/28.5 |
| 4,118,946 A * | 10/1978 | Tubin ............................. 165/46 |
| 4,301,560 A * | 11/1981 | Fraige ............................. 5/684 |
| 5,320,164 A * | 6/1994 | Szczesuil et al. ............... 165/46 |
| 5,592,691 A * | 1/1997 | Ronald ............................. 2/69 |
| 5,755,275 A * | 5/1998 | Rose et al. ...................... 165/46 |
| 5,991,948 A * | 11/1999 | Stanley et al. ..................... 5/709 |
| 6,088,856 A * | 7/2000 | Boyer ............................. 5/644 |
| 6,189,487 B1 * | 2/2001 | Owen et al. ................. 119/28.5 |
| 6,375,674 B1 * | 4/2002 | Carson ......................... 607/104 |
| 6,647,924 B1 * | 11/2003 | Zwicker et al. .............. 119/452 |
| 7,423,243 B2 | 9/2008 | Reusche et al. |
| 7,614,362 B2 * | 11/2009 | Dunn et al. .................. 119/28.5 |
| 2002/0056418 A1 * | 5/2002 | Fleming et al. ............. 119/28.5 |
| 2005/0076855 A1 * | 4/2005 | Throndsen et al. .......... 119/526 |
| 2005/0284416 A1 * | 12/2005 | Smit et al. ..................... 119/850 |
| 2007/0077845 A1 * | 4/2007 | Cheskis ........................ 442/389 |
| 2007/0099533 A1 * | 5/2007 | Ma ................................ 442/389 |
| 2007/0277321 A1 * | 12/2007 | Leach ............................. 5/655 |

* cited by examiner

*Primary Examiner* — Rob Swiatek
*Assistant Examiner* — Ebony Evans
(74) *Attorney, Agent, or Firm* — Joseph M. Butscher; The Small Patent Law Group, LLC

(57) ABSTRACT

A pet bed is configured to transfer heat from a pet to a support structure. The pet bed may include at least one pad defining an internal chamber, and a batting secured within the at least one pad. The batting allows water within the internal chamber to easily flow therethrough so that heat is transferred away from the pet through convection and conduction.

20 Claims, 1 Drawing Sheet

PET BED COOLING SYSTEM AND METHOD

RELATED APPLICATIONS

The present application relates to and claims priority from U.S. Provisional Application No. 60/975,854, entitled "Cooling Pet Bed," filed Sep. 28, 2007, which is hereby incorporated by reference in its entirety.

FIELD OF THE INVENTION

Embodiments of the present invention generally relate to a pet bed or mat, and more particularly, to a system and method of cooling a pet bed or mat.

BACKGROUND OF THE INVENTION

Countless pet owners provide beds or mats to their pets. Pets, such as domesticated dogs, often lounge and rest on these beds and mats. Depending on the ambient temperature, however, pet beds or mats may become uncomfortable for particular pets.

While heated pet beds have existed for some time, cooling systems have been introduced more recently. Typically, these systems transfer a pet's body heat to a cooler surface, such as a concrete floor. One type of cooling system includes a foam bed encased in a material to make it watertight. The foam may then be saturated with water. The water then provides a thermal path for heat from the animal to travel through the bed and dissipated in the floor or to the air around the bed.

A typical cooling pet bed absorbs heat from a pet. As such, the temperature of the water contained within the foam increases. The pet bed moves the heat from the pet to the underlying floor via conduction and convection.

A cooling pet bed increases the surface area by which heat may be dissipated from the pet to ambient air. Typically, in order for the bed to operate properly, the floor must remain cool and absorb the heat. If the temperature of floor increases too much, the water in the bed eventually heats up to the body temperature of the pet and the only cooling that takes place is if the heat is transferred to the surrounding air.

Additionally, the open cell foam used in typical cooling pet beds inhibits the flow of water through the bed. As a result, most of the heat transfer occurs through conduction.

SUMMARY OF THE INVENTION

Certain embodiments of the present invention provide a pet bed configured to transfer heat from a pet to a support structure, such as a floor. The pet bed may include at least one pad defining an internal chamber, and a batting secured within the at least one pad. The batting allows water within the internal chamber to easily flow therethrough (as opposed to open cell foam structures, which inhibit fluid flow) so that heat is transferred away from the pet through convection and conduction. The batting may be formed of polyester, while the pad(s) may be formed of polyvinyl chloride (PVC). At least one cooling gel pack may be positioned within the at least one pad in addition to, or in lieu of, the batting.

The pet bed may also include a fill valve secured to the at least one pad. The fill valve is configured to allow water to be poured into the internal chamber.

The at least one pad may include a plurality of pads. First and second pads may be connected through a flexible crease. At least one of the first and second pads may be separated from a third pad by a slot. The pads are configured to be folded into a stack. At least one strap may selectively secure the third pad to at least one of the first and second pads when the pet bed is unfolded. An additional strap may selectively secure the first, second and third pads as the stack when the pet bed is folded.

Certain embodiments of the present invention provide a pet bed configured to transfer heat from a pet to a support structure that may include a plurality of pads. Each of the pads may define an internal chamber. First and second pads may be connected through a flexible crease. At least one of the first and second pads may be separated from a third pad by a slot. A cooling member, such as a batting configured to be saturated by a water or a cooling gel pack, may be secured within each of the plurality of pads.

Certain embodiments of the present invention provide a pet bed that may include first, second, third, fourth, fifth and sixth pads formed of polyvinyl chloride (PVC), with each of the pads defining an internal chamber. The first pad is connected to the second pad through a first flexible crease having a first orientation (such as parallel with an X axis). The second pad is connected to the third pad through a second flexible crease having a second orientation that is perpendicular to the first orientation (such as parallel to a Y axis). The third pad is connected to the fourth pad through a third flexible crease having the first orientation. The first and fourth pads may be separated by a first slot along the second orientation. The fourth pad is connected to the fifth pad through a fourth flexible crease having the second orientation. The fifth pad is connected to the sixth pad through a fifth flexible crease having the first orientation. The third and sixth pads may be separated by a second slot along the second orientation. The pads are configured to be folded into a stack.

Figure 1:
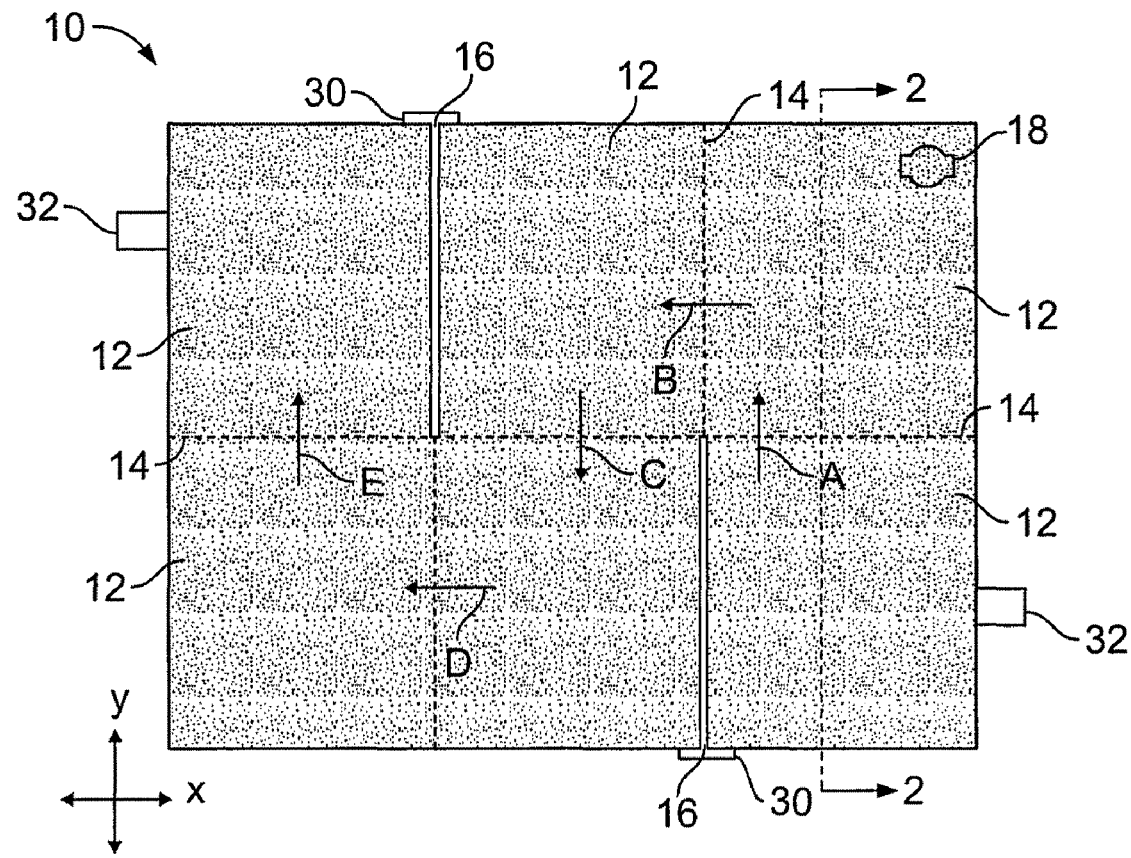
FIG. 1 illustrates a top plan view of a cooling pet bed, according to an embodiment of the present invention.

The foregoing summary, as well as the following detailed description of certain embodiments of the present invention, will be better understood when read in conjunction with the appended drawings. For the purpose of illustrating the invention, there are shown in the drawings, certain embodiments. It should be understood, however, that the present invention is not limited to the arrangements and instrumentalities shown in the attached drawings.

DETAILED DESCRIPTION OF THE INVENTION

Figure 2:
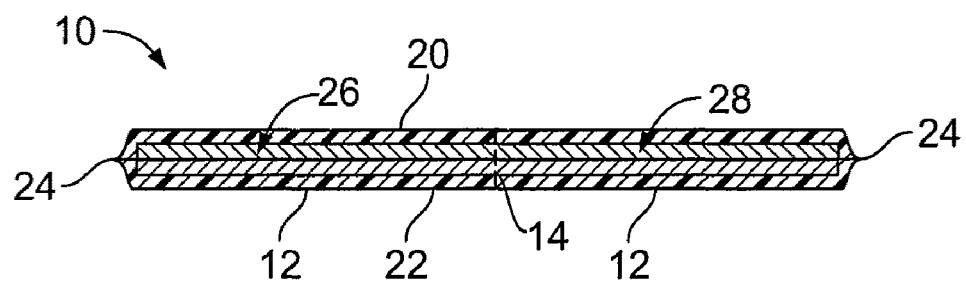
FIG. 2 illustrates a cross-sectional view of a cooling pet bed through line 2-2 of FIG. 1, according to an embodiment of the present invention.

FIG. 1 illustrates a top plan view of a cooling pet bed 10, according to an embodiment of the present invention. The cooling pet bed 10 may be a series of mattresses, mats, pads, or the like. The pet bed 10 includes a series of pads 12. The pads 12 may be connected together through creases 14 that allow the pads 12 to be folded with respect to one another. As can be seen in FIG. 1, some of the creases are aligned parallel with the X axis, while the other creases are aligned parallel with the Y axis, which is perpendicular to the X axis. The creases allow fluid to flow between adjacent pads 12, while at the same time allowing the pads 12 to be folded with respect to one another. Additionally, the cooling pet bed 10 may include one or more slots 16 between adjacent pads 12. As shown in FIG. 2, the slots 16 are aligned parallel to the Y axis. Each pad 12 is sealed between the slots 16 so that water is prevented from flowing into the slots 16. The slots 16 allow the pet bed 10 to be easily and compactly folded in a stack configuration. The cooling pet bed 10 may include more or less pads 12, creases 14 and slots 16 than those shown. For example, the cooling pet bed 10 may include only the rightmost four pads 12 with only the one slot 16.

A fill valve 18, which may be formed of rubber, is located on at least one of the pads 12. The fill valve 18 may be opened to allow water to be poured into, or drained from, the cooling pet bed 10. When the fill valve 18 is closed, water is trapped within the cooling pet bed 10. As noted above, water may pass between adjacent pads 12 through the creases 14.

FIG. 2 illustrates a cross-sectional view of the cooling pet bed 10 through line 2-2 of FIG. 1. Referring to FIGS. 1 and 2, the cooling pet bed 10 may be a single pad 12, or multiple pads 12, as shown in FIG. 1.

Each pad 12 includes a top sheet 20 connected to bottom sheet 22 at fluid-tight lateral seams 24. The sheets 20 and 22 may span between adjacent pads 12. Alternatively, each pad 12 may include separate and distinct sheets 20 and 22 that are integrally connected to those of adjacent pads 12. The longitudinal ends (not shown in FIG. 2) of the sheets 20 and 22 are also connected together at fluid-tight seams. An internal chamber 26 is defined between the sheets 20 and 22. A batting 28 is disposed within the internal chamber 26.

The sheets 20 and 22 may be formed of polyvinyl chloride (PVC), thereby ensuring that water within the internal chamber 26 does not escape therethrough. The batting 28 may be formed of a densified polymer fiber, such as polyester. The batting 28 may be a single piece or multiple pieces, each contained within a particular pad 12. As such, the batting 28 is sandwiched between the compressive layers of the watertight vinyl sheets 20 and 22. For example, the batting 28 may be densified polyester fiber having a thickness of 2-3", while the vinyl sheets 20 and 22 may be formed of PVC and having a thickness of 0.020". It has been found that this particular configuration of the batting 28 and the sheets 20 and 22 provides an efficient system of transferring heat from a pet to the floor.

Compared to foam, it has been found that the polymer batting 28 is much more open and allows increased transfer of heat via convection in addition to conduction. Providing heat transfer via convection and conduction allows for increased cooling times, as opposed to heat transfer by conduction alone (or with minimal convection).

Referring to FIGS. 1 and 2, in operation, a user opens the fill valve 18 in order to pour, water into the cooling pet bed 10. As water enters into the internal chamber 26, it disperses between the pads 12 and saturates the batting 28. As noted above, the batting 28 provides a more efficient and effective path for heat transfer than open cell foam.

The cooling pet bed 10 may be formed in various sizes and slotted or creased in order to allow the pet bed 10 to be folded and placed into a cooling device, such as a refrigerator, to cool the water interior. As shown in FIG. 1, the slots 16 are positioned so that the cooling pet bed 10 may be folded by alternating up and down folds. In this manner, when folded, each pad 12 lies adjacent another pad 12 that shares a common crease 14.

For example, as shown in FIG. 1, the lower right pad 12 may be folded toward the upper right pad 12 in the direction of arrow A about the horizontal (as oriented in FIG. 1) crease 14. These two pads 12 may then be folded onto the upper middle pad 12 in the direction of arrow B. These three stacked pads 12 may be folded down to the lower middle pad 12 in the direction of arrow C. The four stacked pads 12 may then be folded onto the lower left pad 12 in the direction of arrow D. The five stacked pads 12 may then be folded onto the upper left pad 12 in the direction of arrow E. As such, all the pads 12 may be vertically stacked with respect to one another, thereby allowing the pet bed 10 to be compactly stored and/or positioned within a cooling device, such as a refrigerator or freezer. The folding may occur in the opposite direction, or both directions at once (for example, the upper left pad 12 may be folded down toward the lower left pad 12, while the lower right pad 12 is folded onto upper right pad 12). The slots 16 allow the cooling pet bed 10 to be folded in the alternating manner described above. For example, without the lower slot 16, the single lower right pad 12 would be unable to be folded onto the upper right pad 12 by itself. Instead, all three lower pads 12 would follow the movement of the lower right pad 12 if no slot was formed in the pet bed 10. The same holds true for the upper slot 16. In short, the slots 16 allow the cooling pet bed 10 to be folded into a vertical (or horizontal, depending on its orientation) stack.

Additionally, fastening straps 30 may selectively connect and disconnect pads 12 that are separated by the slots 16. For example, the straps 30 may be Velcro® straps. When the pet bed 10 is laid out on a floor for a pet to lay upon, the adjacent pads 12 may be secured to one another. In this manner, the pads 12 are prevented from spreading apart when a pet is lying on the pet bed 10. However, the straps 30 may be unfastened, such as by separating two Velcro® members from one another, to allow the pet bed 10 to be folded, as noted above.

Once folded, additional straps 32 at longitudinal ends of the unfolded pet bed 10 may secure to one another, in order to keep the pet bed 10 in a folded position. Thus, the likelihood of the pet bed 10 unraveling or unfolding while positioned within a cooling device is diminished.

Embodiments of the present invention provide a pet bed 10 that may include a polyester batting core sandwiched within a vinyl envelope defined by the sheets 20 and 22. The valve 18 allows water to be added into the internal chamber 26, thereby providing a thermal transfer path through the batting 28. As such, the heat from an animal lying on top of the pet bed 10 is transferred through the water to a heat sink, such as a concrete floor, that supports the pet bed 10. The pet bed 10 may be divided into a plurality of sections or pads 12 so that it may be folded into a compact square through the creases 14 and slots 16. The folded pet bed 10 may be easily placed within a cooling device, such as a refrigerator or freezer, in order to lower the temperature of the water and provide a cool surface on which a pet may lay.

Instead of water, the pet bed 10 may be filled with other cooling fluids or agents. For example, in addition to (or in lieu of water and/or the batting 28, the internal chamber 26 may be filled with "blue ice" gel packs that have a higher heat capacity than water.

Embodiments of the present invention provide a system and method of increasing the duration and effectiveness of the cooling agent within the pet bed by allowing the pet bed to be refrigerated, frozen or the like within a cooling device. Because certain embodiments of the present invention may be folded, they may be easily and compactly positioned within the cooling device, which is in stark contrast to the bulky conventional cooling pet beds.

Further, unlike conventional open-cell foam cooling pet beds that inhibit the flow of water through the bed (causing most of the heat transfer to be through conduction), the polyester batting allows water to freely flow through the pet bed. Because the interior chamber of the pet bed is more open to water flow, a significant amount of heat can be transferred away from the pet by the convection that results from movement of the pet on the bed. Thus, unlike conventional open-cell foam cooling pet beds, heat transfer within and through the pet bed occurs through convection, as well as conduction, thereby increasing the efficiency and effectiveness of the cooling.

While various spatial terms, such as upper, bottom, lower, mid, lateral, horizontal, vertical, and the like may used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

The invention claimed is:

1. A pet bed configured to transfer heat from a pet to a support structure, the pet bed comprising:
    a plurality of pads defining an internal chamber, wherein first and second pads are connected through a flexible, fluid-tight crease, and wherein at least one of said first and second pads is separated from a third pad by a slot; and
    a batting secured within at least one of said plurality of pads, wherein said batting allows water within said internal chamber to easily flow therethrough so that heat is transferred away from the pet through convection and conduction.

2. The pet bed of claim 1, comprising a fill valve secured to at least one of said plurality of pads, said fill valve configured to allow water to be poured into said internal chamber.

3. The pet bed of claim 1, wherein said batting is formed of polyester.

4. The pet bed of claim 1, wherein said plurality of pads are formed of polyvinyl chloride (PVC).

5. The pet bed of claim 1, wherein said first, second and third pads are configured to be folded into a stack.

6. The pet bed of claim 5, comprising at least one strap that selectively secures said first, second and third pads as said stack when folded.

7. The pet bed of claim 5, comprising at least one cooling gel pack within said at least one pad.

8. The pet bed of claim 1, comprising at least one strap that selectively secures said third pad to at least one of said first and second pads when the pet bed is unfolded.

9. A pet bed configured to transfer heat from a pet to a support structure, the pet bed comprising:
    a plurality of pads, each of said plurality of pads defining an internal chamber, wherein first and second pads are connected through a flexible, fluid-tight crease and wherein at least one of said first and second pads is separated from a third pad by a slot; and
    a cooling member secured within each of said plurality of pads.

10. The pet bed of claim 9, wherein said cooling member comprises a polyester batting configured to be saturated by water.

11. The pet bed of claim 9, wherein said cooling member comprises a cooling gel pad.

12. The pet bed of claim 9, comprising a fill valve secured to said at least one pad, said fill valve configured to allow water to be poured into said internal chamber.

13. The pet bed of claim 9, wherein each of said plurality of pads are formed of polyvinyl chloride (PVC).

14. The pet bed of claim 9, wherein said first, second and third pads are configured to be folded into a stack.

15. The pet bed of claim 14, comprising at least one strap that selectively secures said third pad to at least one of said first and second pads when the pet bed is unfolded.

16. The pet bed of claim 15, comprising at least one strap that selectively secures said first, second and third pads as said stack when folded.

17. A pet bed configured to transfer heat from a pet to a support structure, the pet bed comprising:
    first, second, third, fourth, fifth and sixth pads formed of polyvinyl chloride (PVC), each of said pads defining an internal chamber, said first pad being connected to said second pad through a first flexible crease having a first orientation, said second pad being connected to said third pad through a second flexible crease having a second orientation that is perpendicular to the first orientation, said third pad being connected to said fourth pad through a third flexible crease having the first orientation, said first and fourth pads being separated by a first slot along the second orientation, said fourth pad being connected to said fifth pad through a fourth flexible crease having the second orientation, said fifth pad being connected to said sixth pad through a fifth flexible crease having the first orientation, said third and sixth pads being separated by a second slot along the second orientation, said pads being configured to be folded into a stack;
    a fill valve secured to at least one of said pads, said fill valve configured to allow water to be poured into said internal chambers; and
    a polyester batting secured within said internal chambers of each of said pads, wherein said batting allows water within said internal chambers to flow therethrough so that heat is transferred away from the pet through convection and conduction.

18. The pet bed of claim 17, comprising:
    a first strap that selectively secures said first pad to said fourth pad when the pet bed is unfolded; and
    a second strap that selectively secures said third pad to said sixth pad when the pet bed is unfolded.

19. The pet bed of claim 17, comprising at least one cooling gel pack within said internal chambers.

20. The pet bed of claim 17, wherein said first, second, third, fourth, and fifth flexible creases are fluid-tight.

* * * * *